(12) United States Patent
Bathrick

(10) Patent No.: US 9,015,822 B2
(45) Date of Patent: Apr. 21, 2015

(54) AUTOMATIC INVOCATION OF DTN BUNDLE PROTOCOL

(75) Inventor: Erwin W. Bathrick, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 765 days.

(21) Appl. No.: 12/617,093

(22) Filed: Nov. 12, 2009

(65) Prior Publication Data

US 2010/0125901 A1 May 20, 2010

Related U.S. Application Data

(60) Provisional application No. 61/114,570, filed on Nov. 14, 2008.

(51) Int. Cl.
| | | |
|---|---|---|
| *H04L 21/00* | (2006.01) | |
| *H04L 29/08* | (2006.01) | |
| *H04L 29/06* | (2006.01) | |
| *H04L 12/701* | (2013.01) | |
| *H04L 12/26* | (2006.01) | |
| *H04L 12/703* | (2013.01) | |

(52) U.S. Cl.
CPC .......... *H04L 67/322* (2013.01); *H04L 63/0245* (2013.01); *H04L 43/0852* (2013.01); *H04L 45/00* (2013.01); *H04L 45/28* (2013.01); *H04L 67/2819* (2013.01); *H04L 69/22* (2013.01)

(58) Field of Classification Search
CPC . H04L 67/2819; H04L 45/28; H04L 43/0852; H04L 63/0428; H04L 63/145; H04L 63/0245
USPC .......... 709/222, 228, 230–232; 726/12, 13, 1
See application file for complete search history.

(56) References Cited

U.S. PATENT DOCUMENTS

| | | | | |
|---|---|---|---|---|
| 6,674,743 | B1 * | 1/2004 | Amara et al. ................. | 370/351 |
| 7,613,828 | B2 * | 11/2009 | Zintel et al. .................... | 709/239 |
| 2002/0010866 | A1 * | 1/2002 | McCullough et al. ........ | 713/201 |
| 2004/0252721 | A1 * | 12/2004 | Lingafelt et al. .............. | 370/473 |

(Continued)

OTHER PUBLICATIONS

Forrest Warthman, "Delay-tolerant Networks", Mar. 2003, pp. 1-34 http://www.ipnsig.org/reports/DTN_Tutorial11.pdf.*

(Continued)

*Primary Examiner* — Kambiz Zand
*Assistant Examiner* — Carlos M De Jesus Lassaia
(74) *Attorney, Agent, or Firm* — Lando & Anastasi, LLP

(57) ABSTRACT

A system and method for providing DTN services to legacy applications is provided. According to one example, a method for providing delay tolerant networking (DTN) services to legacy applications includes acts of intercepting a packet addressed to a software application, the packet including a payload, the software application being resident on a first computer, determining suitability of the packet for DTN processing and encoding the payload into a DTN bundle. According to another example, a system for providing delay tolerant networking (DTN) services to legacy applications includes a network interface, a memory and a controller coupled to the network interface and the memory. In this example, the controller is configured to intercept a packet addressed to a software application, the packet including a payload, the software application being resident on a computer, determine suitability of the packet for DTN processing and encode the payload into a DTN bundle.

25 Claims, 14 Drawing Sheets

(56) References Cited

U.S. PATENT DOCUMENTS

2006/0287956 A1* 12/2006 Higashi et al. .................. 705/51
2007/0115990 A1* 5/2007 Asati et al. .................... 370/392

OTHER PUBLICATIONS

Forrest Warthman, "Delay-tolerant Networks", Mar. 2003, pp. 1-34 http://www.ipnsig.org/reports/DTN_Tutoriall 1.pdf.*

"Zorp 3.1 Administrator's guide" Jan. 2008, http://www.balabit.com/sites/default/files/documents/zorp-3.1-guides/zorp-gateway-v3.1-guide-admin-en.html/ch09s03.html.*

Ott et al., "Applying DTn to Mobile internet Access: An Experiment with HTTP", Jul. 2005, pp. 1-13, http://www.google.com/url?sa=t &rct=j&q=&esrc=s&frm=1&source=web&cd=1 &ved=0CDcQFjAA&url=http%3A%2F%2Fciteseerx.ist.psu. edu%2Fviewdoc%2Fdownload%3Fdoi%3D10.1.1.65. 8942%26rep%3Drep1%26type%3Dpdf &ei=MvbQUIrGBcfx0gHB2oHADQ &usg=AFQjCNED0wAoONeyxzoOsn9FtoQ6N.*

Ott et al., "Applying DTn to Mobile internet Access: An Experiment with HTTP", Jul. 2005, pp. 1-13, http ://www.google.co m/url ?sa= t& rct=j&q=&esrc=s&frm=1&source=web&cd=1&ved= 0CDcQFjAA&url=http%3A%2 F%2Fciteseerx.ist.psu. edu%2Fviewdoc%2Fdownload%3Fdoi%3D10.1.1.65.8942%26 rep%3Drep1%26type%3Dpdf&ei=MvbQUIrGBcfx0gH.*

R. Beck, "GPSDTN: Predictive Velocity-Enabled Delay-Tolerant Networks for Artic Reseacrh and Sustainablilty", Second International Conference on Internet Monitoring and Protection, 2007, pp. 1-9 http://eprints.ulster.ac.uk/21152/.*

Forrest Warthman, "Delay-tolerant Networks", Mar. 2003, pp. 1-34 http://www.ipnsig.org/reports/DTN_Tutoriall 1 .pdf.*

"Zorp 3.1 Administrator's guide" Jan. 2008, http://www.balabit.com/sites/default/files/documents/zorp-3.1-guides/zorp- gateway-v3.1 -guide-admin-en.html/ch09s03.html.*

Petz et al., "An Adaptive Architecture to Support Delay Tolerant Networking" Aug. 2008, pp. 1-11, http://wayback.archive.org/web/20080815000000*/http://www.mpc.ece.utexas.edu/Papers/TR-UTEDGE-2008-002.pdf.*

Ott et al., "Applying DTn to Mobile internet Access: An Experiment with HTTP", Jul. 2005, pp. 1-13, http ://www.google.com/url?sa=t &rct=j&q=&esrc=s&frm=1 &source=web&cd=1 &ved=0CDcQFjAA&url=http%3A%2 F%2Fciteseerx.ist.psu. edu%2Fviewdoc%2Fdownload%3Fdoi%3D10.1.1.65. 8942%26rep%3Drep1%26type%3Dpdf &ei=MvbQUIrGBcfx0gH.*

Peltola et al, "Enabling DTN-based Web Access: the Server Side", Apr. 2008, Helsinki University of Technology, pp. 1-72 http://www.netlab.tkk.fi/~jo/dtn/2008-Lauri-Peltola.pdf.*

Krishnan et al. "The SPINDLE Disruption-Tolerant Networking System" 2007, pp. 1-7 http://rajesh-krishnan.com/pubs/krishnan_milcom07.pdf.*

V.Cerf, "Delay-Tolerant Networking Architecture" Apr. 2007, pp. 1-35 http://www.ietf.org/rfc/rfc4838.txt.*

Scott et al., "Bundle Protcol Specification" RFC 5050, Nov. 2007, pp. 1-49, https://tools.ietf.org/html/rfc5050.*

Deepak et al. "Performance analysis and evaluation of delay-tolerant network bundling protocol on a scalable virtual network test platform", IEEE, Jan. 2008, pp. 52-55, http://ieeexplore.ieee.org/xpl/articleDetails.jsp?arnumber=4470073.*

Farrell et al., "Delay Tolerant Networking Security Overview", Jun. 2007, pp. 1-29 https://tools.ietf.org/html/draft-irtf-dtnrg-sec-overview-03.*

Beck. R. et al., "GPSDTN: Predictive-Velocity-Enabled Delay-Tolerant Networks for Arctic Research and Sustainability", ICIMP, 2007.

Van Der Meer, J. et al., Draft-IETF-AVT-MPEG4-Simple-07.txt, IETF, Feb. 2003, pp. 1-31.

* cited by examiner

--Prior Art--

--Prior Art--

AUTOMATIC INVOCATION OF DTN BUNDLE PROTOCOL

RELATED APPLICATIONS

This application claims priority under 35 U.S.C. §119(e) to U.S. Provisional Application Ser. No. 61/114,570, entitled "AUTOMATIC INVOCATION OF DTN BUNDLE PROTOCOL," filed on Nov. 14, 2008, which is herein incorporated by reference in its entirety.

BACKGROUND

1. Field of the Invention

At least one aspect in accord with the present invention relates generally to apparatus and methods for networking computer systems, and more specifically, to apparatus and methods for networking computer systems using disruption/delay tolerant networking (DTN).

2. Discussion of Related Art

In a traditional DTN (Disruptive/Delay Tolerant Networking) system there are servers and clients. The servers include Bundle Protocol Agents (BPAs) and the clients have a service called the BPA application program interface (API) which allows applications to invoke DTN functionality encapsulated in the BPA. An example of a DTN network topology is illustrated (in block diagram form) in FIG. 1. Packets are passed from a DTN client 102 via one or more DTN servers 104 to another DTN client 102, as indicated by arrows 106.

An example of normal DTN communications using standard interfaces is illustrated in FIG. 2. A networking application 208 uses the DTN BPA API 210 to transfer a payload to the DTN BPA 212 which may forward the payload through several other DTN BPAs 212 (associated with DTN servers 204) until the payload is delivered to an intended destination client 214.

Along with a payload, the client 202 specifies a DTN address, and DTN options such as, for example, custodial option, service type (for example, guaranteed delivery, etc.) and payload lifetime. These elements are encapsulated in an external data representation (XDR) encoded string and passed, via the DTN BPA API 210, to a BPA daemon through a TCP/IP stream. The BPA daemon decodes the XDR and handles the payload according to the specified DTN options. The payload then moves from DTN server to DTN server, as shown by a dotted line 206 in FIG. 2, until the payload reaches the DTN server that is acting as the destination for the particular DTN client identified in the packet.

SUMMARY OF THE INVENTION

Conventionally, in order to make use of the standard DTN communications described above, applications must be aware of DTN and its options, and explicitly use the DTN services to achieve its benefits. Those applications that do not expressly support DTN are unable to realize the benefits of the DTN protocols without being modified to bundle specific packets. As a result, these applications cannot realize the benefits of DTN after the original packet has been transmitted.

Some examples in accord with the present invention relate generally to apparatus and methods for disruption/delay tolerant networking (DTN), and more specifically, to apparatus and methods for seamlessly providing applications, including pre-existing, non-DTN-aware applications, with DTN functionality. These examples allow applications that do not support DTN to benefit from DTN and its robust services without requiring any modifications to the applications. In addition, examples may provide valuable network layer functionality, such as guaranteed delivery, decreased bandwidth consumption and decreased source retransmission of packets, that may be beneficial to a wide variety of communications or applications.

According to one example, a computer-implemented method for providing delay tolerant networking (DTN) services to software applications is provided. The method includes the acts of intercepting, by a first computer, a packet addressed to a software application, the packet including a payload, determining suitability of the packet for DTN processing and, responsive to determining that the packet is suitable, encoding the payload into a DTN bundle.

In the method, the act of intercepting, by the first computer, a packet may include an act of establishing an operating system hook. In addition, the act of determining the suitability of the packet may include an act of reading an indication that packets generated by the software application are targeted for DTN servicing. Further, the act of determining the suitability of the packet may include acts of reading an indication that packets encoded according to a specified protocol are targeted for DTN servicing and determining that the packet is encoded according to the specified protocol of the packet. Moreover, the act of determining the suitability of the packet may include acts of reading an indication that packets including a specified source address are targeted for DTN servicing and determining that the packet has the specified source address. Additionally, the act of determining the suitability of the packet may include acts of reading an indication that packets including a specified destination address are targeted for DTN servicing and determining that the packet has the specified destination address. Furthermore, the act of determining the suitability of the packet may include acts of reading an indication that packets including a specified destination port are targeted for DTN servicing and determining that the packet has the specified destination port.

In the method, the act of determining the suitability of the packet may include acts of reading an indication that packets generated by software applications in a specified processing state are targeted for DTN servicing and determining, from the packet, that the software application is in the specified processing state. In addition, the act of determining the suitability of the packet may include acts of reading an indication that packets generated by software applications performing a specified function are targeted for DTN servicing and determining, from the packet, that the software application is performing the specified function. Further, the act of determining the suitability of the packet may include acts of reading an indication that packets including payloads of a specified data type are targeted for DTN servicing and determining that the payload has the specified data type. Moreover, the act of determining the suitability of the packet may include an act of reading an indication that packets including payloads having a specified lifetime are targeted for DTN servicing and determining that the payload has the specified lifetime. In addition, the act of determining the suitability of the packet may include acts of reading an indication that packets including payloads having an acceptable latency for delivery to a software application are targeted for DTN servicing and determining that the payload has the acceptable latency.

According to the method, the act of reading the indication may include an act of reading the indication from a policy and determining that the packet meets at least one criterion specified in the policy. In addition, the act of encoding the payload may include an act of stripping at least one protocol header from the packet. Further, the act of encoding the payload may include an act of encoding the payload in response to a determination that a value in the packet is great than a threshold. Moreover, the software application may be resident on a second computer and the method further include an act of transmitting the DTN bundle to the second computer.

The method may also include an act of determining a route for the packet and the act of determining the suitability of the packet may include an act of determining whether the route has failed. In addition, the method may include an act of encoding another payload from a different packet into the DTN bundle. Further, the method may include acts of decoding the payload from the DTN bundle and providing the payload to the software application.

According to another example, a first computer system for providing delay tolerant networking (DTN) services to software applications is provided. The system includes a network interface, a memory and a controller coupled to the network interface and the memory. The controller is configured to automatically intercept a packet addressed to a software application, the packet including a payload, determine suitability of the packet for DTN processing, determine that the packet is suitable and encode, responsive to the determination that the packet is suitable for DTN processing, the encode payload into a DTN bundle.

In the first computer system, the controller may be further configured to establish an operating system hook to intercept the packet. In addition, the controller configured to determine the suitability of the packet may be further configured to read an indication that packets generated by the software application are targeted for DTN servicing. Further, the controller configured to determine the suitability of the packet may be further configured to read an indication that packets encoded according to a specified protocol are targeted for DTN servicing and determine that the packet has the specified protocol. Moreover, the controller configured to determine the suitability of the packet may be further configured to read an indication that packets including a specified source address are targeted for DTN servicing and determine that the packet has the specified source address. Additionally, the controller configured to determine the suitability of the packet may be further configured to read an indication that packets including a specified destination address are targeted for DTN servicing and determine that the packet has the specified destination address. Furthermore, the controller configured to determine the suitability of the packet may be further configured to read an indication that packets including a specified destination port are targeted for DTN servicing and determine that the packet has the specified destination port.

According to the first computer system, the controller configured to determine the suitability of the packet may be further configured to read an indication that packets generated by software applications in a specified processing state are targeted for DTN servicing and determine, from the packet, that the software application is in the specified processing state. In addition, the controller configured to determine the suitability of the packet may be further configured to read an indication that packets generated by software applications performing a specified function are targeted for DTN servicing and determine, from the packet, that the software application is performing the specified function. Further, the controller configured to determine the suitability of the packet may be further configured to read an indication that packets including payloads of a specified data type are targeted for DTN servicing and determine that the payload has the specified data type. Moreover, the controller configured to determine the suitability of the packet may be further configured to read an indication that packets including payloads having a specified lifetime are targeted for DTN servicing and determine to determine that the payload has the specified lifetime. Additionally, the controller configured to determine the suitability of the packet may be further configured to read an indication that packets including payloads having an acceptable latency for delivery to the software application are targeted for DTN servicing and determine that the payload has the acceptable latency. Furthermore, the controller configured to determine the suitability of the packet may be further configured to compare the packet to a policy.

In the first computer system, the controller configured to encode the payload may be further configured to strip at least one protocol header from the packet. In addition, the controller configured to encode the payload may be further configured to encode the payload in response to a comparison between a value in the packet and a threshold or in response to a determination that a value in the packet is greater than a threshold. Further, the controller may be further configured to transmit the DTN bundle to a second computer via the network interface. Moreover, the controller may be further configured to determine a route for the packet and determine the suitability of the packet at least in part by determining whether the route has failed. Additionally, the controller may be further configured to encode another payload from a different packet into the DTN bundle.

According to another example, a system for providing delay tolerant networking (DTN) services to software applications is provided. The system includes a first computer and a second computer. The first computer includes a first network interface, a first memory and a first controller coupled to the first network interface and the first memory. The first controller is configured to automatically intercept a packet addressed to a software application, the packet including a payload, determine suitability of the packet for DTN processing, responsive to a determination that the packet is suitable for DTN processing, encode the payload into a DTN bundle.

In the system, the second computer may include a second network interface, a second memory and a second controller coupled to the second network interface and the second memory. The second controller may be configured to receive the DTN bundle via the second network interface and decode the packet addressed to the software application from the DTN bundle.

Still other aspects, examples, and advantages of these exemplary aspects and examples, are discussed in detail below. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example. The accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF DRAWINGS

Various aspects of at least one example are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
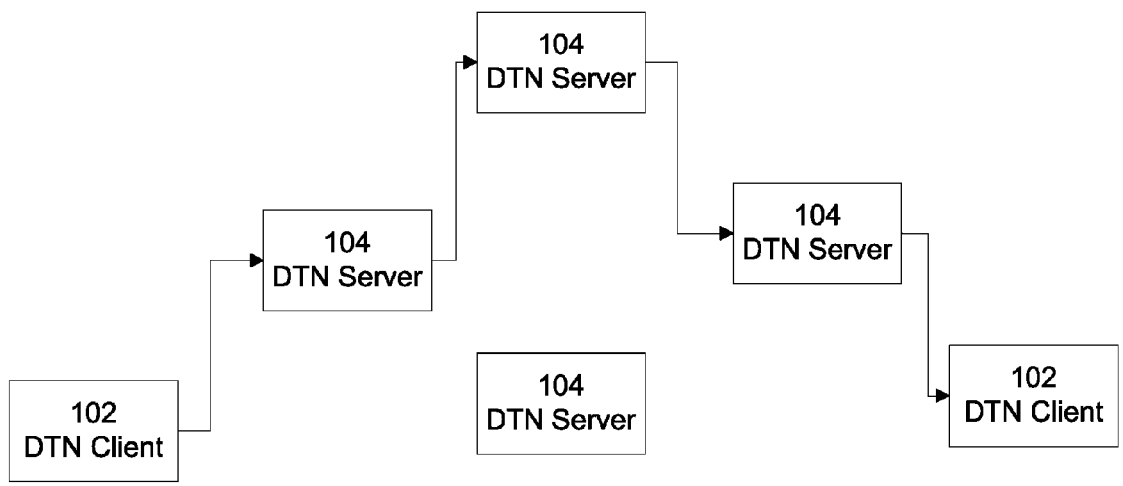
FIG. 1 is a block diagram of an example of a DTN delivery system.
Figure 2:
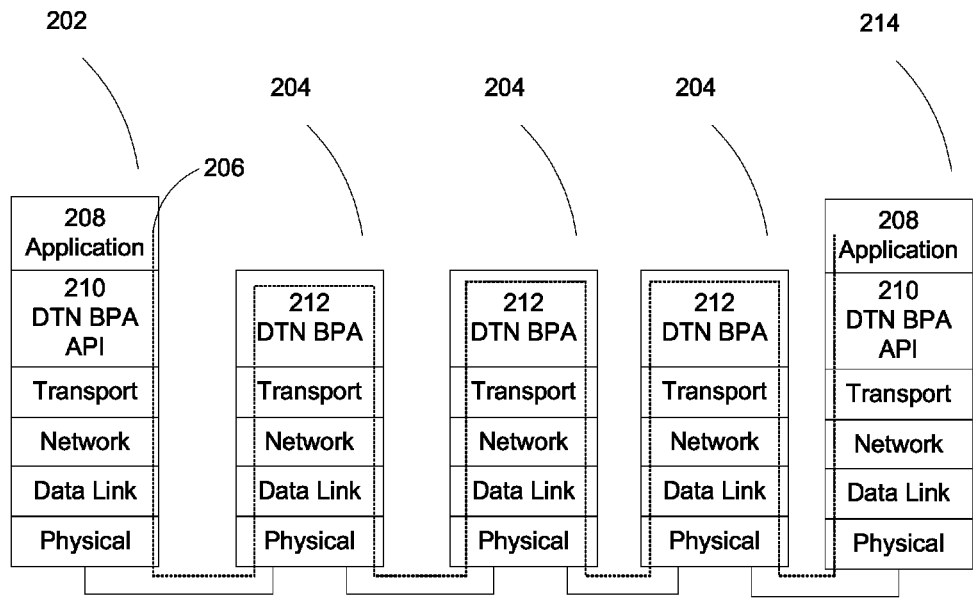
FIG. 2 is a block diagram illustrating the flow of information through an example DTN delivery system.

Aspects and examples relate to apparatus and processes for providing legacy applications with robust, fault tolerant networking functionality, without requiring modifications to the legacy applications. For instance, methods and apparatus in accord with some examples allow for the capturing of packets that would otherwise be dropped (for instance, because of route failure) resulting in less than 100% packet delivery. Thus, some examples provide the ability to allow packets to traverse the network and only invoke the bundling protocol when networking failures occur or when other bundling policy conditions are met. Selective invocation of the DTN protocol enables the examples disclosed herein to conserve computing resources by providing DTN functionality to applications on an as-needed basis.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

According to one example, a bundle flow agent (BFA) intercepts and analyzes packets as they traverse the network. The term "packet" has a well-known meaning to those skilled in the art. However, as referred to herein, a packet includes any protocol unit that transports data over a network and therefore encompasses packets, datagrams, a collection of packets or datagrams or any other type of data or part of data. According to one example, if the BFA determines that the packet is suitable for DTN delivery, the BFA automatically reformats the packet into a DTN bundle and forwards the bundle to a bundle protocol agent (BPA) for further processing according to the DTN protocol, as discussed further below. As used herein, the term "bundle" is a packet structured for DTN processing and may include one or more non-DTN packets. BFAs may determine whether packets are suitable based on defined policies keyed on particular types of packet data or particular network conditions, as discussed further below. Thus, some examples provide a robust automatic communications mechanism for applications that are not well adapted to wireless networks or that are not resilient to poor connectivity and thereby provide these applications with 100% (or close to 100%) packet delivery.

For instance, according to one example, a computer system is configured to perform any of the functions described herein, including but not limited to, intercepting a packet and bundling the packet in DTN protocol. However, such a system may also perform other functions such as presenting a user interface to allow a user to configure a bundling policy that indicates characteristics of packets that would benefit from DTN processing. Moreover, the systems described herein may be configured to include or exclude any of the functions discussed herein. Thus the examples are not limited to a specific function or set of functions.

Computer System

Various aspects and functions described herein may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

Figure 3:
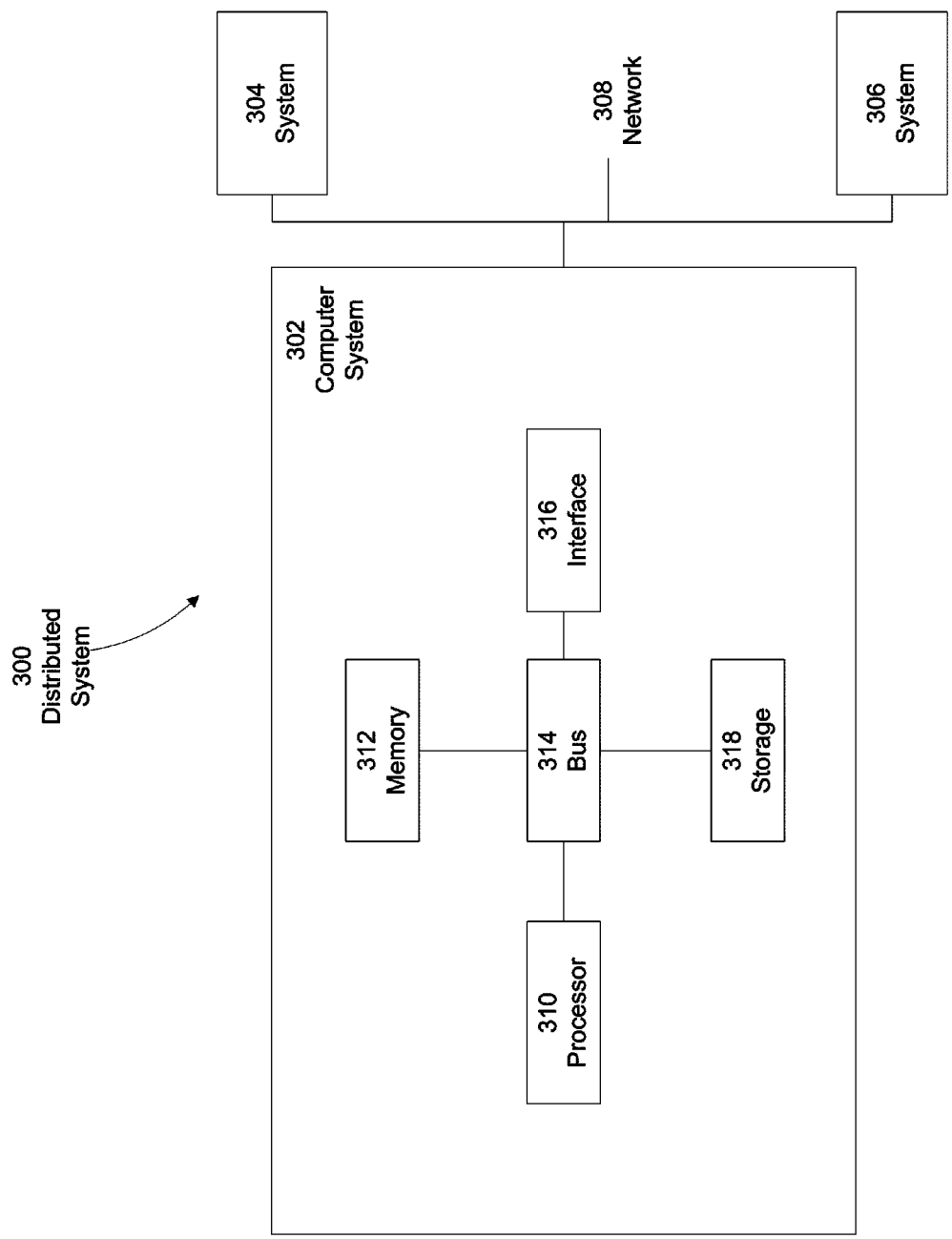
FIG. 3 is a block diagram of an example computer system within which various aspects in accord with the present invention may be implemented.

Referring to FIG. 3, there is illustrated a block diagram of a distributed computer system 300, in which various aspects and functions may be practiced. The distributed computer system 300 may include one more computer systems that exchange, i.e. send or receive, information. For example, as illustrated, the distributed computer system 300 includes computer systems 302, 304 and 306. As shown, the computer systems 302, 304 and 306 are interconnected by, and may exchange data through, communication a network 308. The network 308 may include any communication network through which computer systems may exchange data. To exchange data using the network 308, the computer systems 302, 304 and 306 and the network 308 may use various methods, protocols and standards, including, among others, Token Ring, Ethernet, Wireless Ethernet, Bluetooth, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TSL, SSL or VPN. While the distributed computer system 300 illustrates three networked computer systems, the distributed computer system 300 is not so limited and may include any number of computer systems and computing devices, networked using any medium and communication protocol.

Various aspects and functions may be implemented as specialized hardware or software executing in one or more computer systems including the computer system 302 shown in FIG. 3. As depicted, the computer system 302 includes a processor 310, a memory 312, a bus 314, an interface 316 and a storage 318. The processor 310 may perform a series of instructions that result in manipulated data. The processor 310 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 310 is connected to other system elements, including one or more memory devices 312, by the bus 314.

The memory 312 may be used for storing programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein.

Components of the computer system 302 may be coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. Thus, the bus 314 enables communications, for example, data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and communicate with external entities, such as users and other systems.

The storage system 318 may include a computer readable and writeable nonvolatile data storage medium in which instructions are stored that define a program that may be executed by the processor 310. The storage system 318 also may include information that is recorded, on or in, the medium, and this information may be processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller may cause data to be read from the nonvolatile recording medium into another memory, such as the memory 312, that allows for faster access to the information by the processor 310 than does the storage medium included in the storage system 318. The memory may be located in the storage system 318 or in the memory 312, however, the processor 310 may manipulate the data within the memory 312, and then copy the data to the medium associated with the storage system 318 after processing is completed. A variety of components may manage data movement between the medium and integrated circuit memory element and examples is not limited thereto. Further, examples are not limited to a particular memory system or storage system.

Although the computer system 302 is shown by way of example as one type of computer system upon which various aspects and functions may be practiced, aspects are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. Usually, a processor or controller, such as the processor 310, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 310 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed here may include a wide variety of facilities, e.g. executable code, data structures or objects, configured to perform their described functions.

The Bundle Flow Agent

Figure 4:
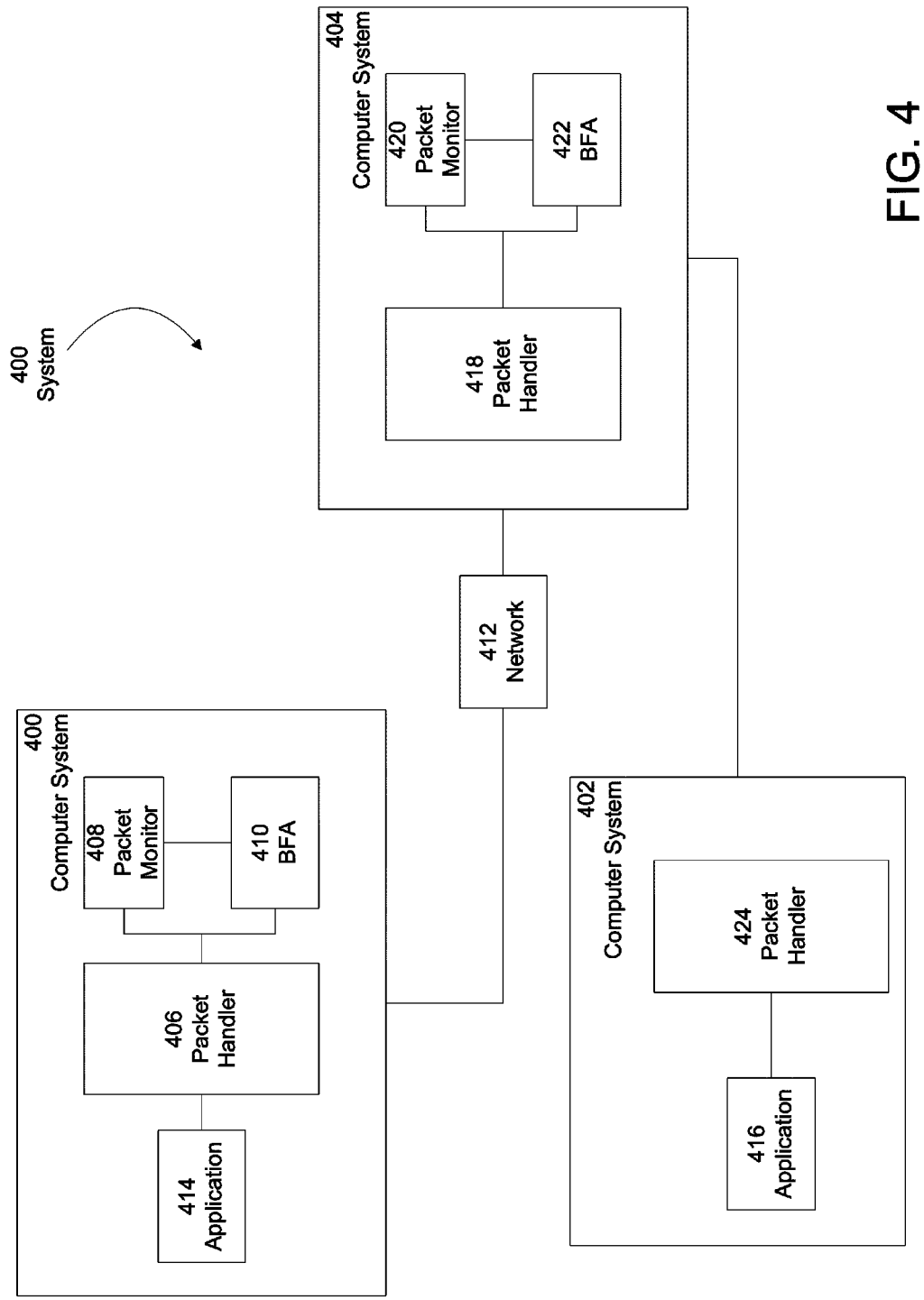
FIG. 4 is a block diagram of an example distributed system in accord with aspects of the present invention.

FIG. 4 presents a context diagram including physical and logical elements of distributed system 400. The distributed system 400 is one example of a system that is specially configured to perform the functions disclosed herein. However, the system structure and content recited with regard to FIG. 4 are for exemplary purposes only and are not intended to limit other examples to the specific structure shown in FIG. 4. As will be apparent to one of ordinary skill in the art, many variant system structures can be architected without deviating from the substance of the examples disclosed herein.

Referring to FIG. 4, a system 400 includes computer systems 400, 402 and 404 and a communications network 412. As illustrated, the computer systems 400, 402 and 404 are interconnected and configured to exchange information via the network 412. The network 412 may include any communication network through which member computer systems may exchange data. For example, the network 416 may be a public network, such as the internet, and may include other public or private networks such as LANs, WANs, extranets and intranets. Each of the computer systems 400, 402 and 404 and the network 412 may include one or more computer systems. As discussed above with regard to FIG. 3, computer systems may have one or more processors or controllers, memory and interface devices. The particular configuration of system 400 depicted in FIG. 4 is used for illustration purposes only and examples may be practiced in other contexts. For instance, in at least one example which is discussed further below, the computer system 404 is a router configured to include functions disclosed herein. Thus, examples are not limited to a specific number or type of systems.

As shown, the computer system 400 includes an application 414, a packet handler 406, a packet monitor 408 and a bundle flow agent (BFA) 410. The computer system 404 includes a packet hander 418, a packet monitor 420 and a BFA 422. The computer system 402 includes an application 416 and a packet handler 424. The applications 414 and 416 exchange packets with one another via a packet handler 406. However, the applications 414 and 416 are not configured to utilize DTN.

According to one example, the elements illustrated in FIG. 4 include facilities that are configured to exchange information as follows. The packet handlers 406, 418 and 424 receive packets from the network 412, process the packets and provide the processed packets to client applications. As illustrated, these client applications include the applications 414 and 416 and the packet monitors 408 and 420. The packet monitors 408 and 420 intercept packets and forward packets to the BFAs 410 and 422, respectively. In one example, which is discussed in more detail below, the packet monitors 408 and 420 intercept packets at one or more particular points during their processing by the packet handler 406 and 418. The BFAs 410 and 422, in turn, process the packet using information required to enable DTN processing of the packet via the network 412. More particularly, the BFAs 410 and 422 examine and process packets to determine whether DTN processing can be or should be implemented. For instance, in this example, the BFAs 410 and 422 determine the suitability of packets for DTN processing based on various packet characteristics and automatically invoke a DTN BPA to inject the reformatted packets into a DTN delivery system to route the packets via the DTN server. Some of these packet characteristics include, among others, the content of the payload, the content of the header (such as the TCP, UDP, IP portions) and the actual application encoding (which is similar to the information used by a stateful firewall) included in the packet, wherever it is located therein. For instance, in one example, the BFAs 410 and 422 avoid DTN processing of packets including real-time or near real-time data, such as video data. Additionally, BFAs 410 and 422 receive DTN bundles and repackage the bundles into a format expected by a destination of the packet.

In some examples, BFAs 410 and 422 determine the suitability of packets with reference to policy statements included in one or more bundling policies. These policy statements may be predefined and include what, if any, options and parameters within DTN should be executed for a packet. Policy statements may specify a wide range of selection criteria including packet characteristics, network conditions and events that may occur to particular packets, e.g. rejection of a packet by the routing layer. Examples of information upon which criteria for policy statements may be based includes, among others, port numbers, protocol ID, specific protocol usage, specific destination or source address usage (such as IP address) or any patterns in the protocol layer that identify the applications state, payload or function being performed. Additionally, criteria for policy statements may include identification of a route failure, identification of particular packet traffic patterns or identification of particular application traffic. According to some of these examples, BFAs 410 and 422 reformat the packet in compliance with DTN protocol if the packet meets one or more criterion specified in the at least one predefined policy statement. In some examples, BFAs 410 and 422 reformat multiple packets into a single DTN bundle. In another example, the policies that determine when data is intercepted by the BFAs 410 and 422 are configurable and may be changed, as needed or desired, to identify which applications or packets should use DTN and which should not, in a given circumstance or network environment.

In another example, policy statements include criteria that directs DTN processing of packets based on the useful lifespan of data included in the payload of the packet. In this example, data with a relatively longer lifespan is supported with DTN processing and data with a relatively shorter lifespan is not. For instance, situational awareness data might have a network lifespan of 5 minutes, where as map data transfers might have a lifespan of 5 days. Further, in some examples, the policy statements my include threshold values to differentiate between relatively longer and shorter lifespans.

In a particular example, the application 414 transmits a packet addressed to the application 416 via the packet handler 406. The packet handler 406 receives the packet and allows the packet monitor 408 to examiner the packet. The packet monitor 408 determines that the packet is suitable for DTN processing, automatically invokes the BFA 410 and provides the packet to the BFA 410. The BFA 410 wraps the packet with information to enable the overall system 400 to process the packet using DTN functionality. The BFA 410 then provides the bundle to the packet handler 406.

Continuing the example, the packet handler 406 transmits the bundle to the network 412 where the bundle travels until it reaches a computer system hosting the BFA responsible for processing DTN bundles for the application 416, i.e. computer system 404. The packet handler 418 receives the bundle and allows the packet monitor 420 to examine the bundle. The packet monitor 420 determines that the bundle is a DTN bundle addressed to the application 416 and presents the bundle to the BFA 422. The BFA 422 automatically unwraps the packet and provides the unwrapped packet to the packet handler 418. The packet handler 418 then transmits the packet to the computer system hosting the application to which the packet is addressed, i.e. computer system 402. As the final step in this particular example, the packet hander 424 receives the packet and provides the packet to the application 416 for processing. Thus, the example of FIG. 4 provides DTN functionality to legacy software applications.

In the example illustrated in FIG. 4, the packet monitors 408 and 420 are separate from BFA 410 and BFA 422, respectively. In an alternate example, the packet monitors 408 and 420 are integrated with BFA 410 and BFA 422, respectively. Thus, in this alternate example, the packet monitors are included within the BFAs. In addition, the example of FIG. 4 depicts computer systems 404 and 402 as separate physical devices, such as, for example, a router and a server. In an alternate example, the packet monitor 420 and the BFA 422 are included on the computer system 402. Thus examples are not limited to a specific logical or physical structure.

In addition, while the example shown in FIG. 4 performs DTN processing on a packet by packet basis, other examples bundle one or more packets into a single DTN bundle. In one of these examples, DTN bundles are created such that some or all of the information required for a destination application to process a single transaction is included in the DTN bundle. This approach may promote network efficiency depending on the characteristics of the applications involved.

Figure 5:
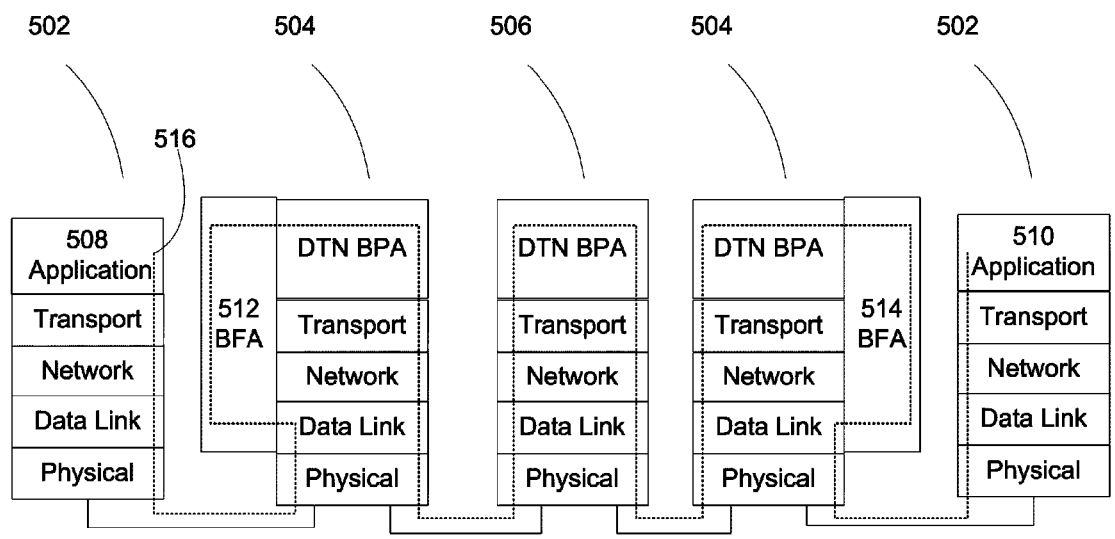
FIG. 5 is a block diagram illustrating the flow of information through an example distributed system in accord with aspects of the present invention.

In another example, the BFAs include the packet monitors and reside on network devices that are separate from application servers. Such a configuration is shown in FIG. 5. In particular, FIG. 5 includes application servers 502, routers 504 and a network backbone 506. The application servers host applications 508 and 510 and have packet handlers that include TCP/IP stacks. The routers 504 include BFAs 512 and 514. In this example, the routers 504 and the network backbone 506 have packet handlers that include TCP/IP stacks that are coupled to DTN BPAs. In addition, the applications 508 and 510 use TCP/IP sockets to exchange packets through a network via TCP/IP stacks. Thus, in this example, the BFAs 512 and 514 are implemented at Layer 3 in the ISO protocols model, and intercept data that has, for example, been rejected by the routing layer, or when the packet has criteria matching a policy statement.

Referring to FIG. 5, there is illustrated an example of communications flow (shown as a dotted line 516) using exemplary methods and BFAs. The application 508, which does not support DTN, transmits packets intended for a destination 510. Analysis of the packets occurs in the BFA 512. The BFA 512 includes a policy engine that determines the applicability of policies to the packets. In one example, the policy engine is implemented as a combination of a NetFilters IPTables packet monitor and custom analysis code included in the BFA 512. As discussed further below, NetFilters IPTables establish hooks that alter the behavior of the operating system. These hooks intercept packets at particular processing stages and provide the packets to other logical entities for further processing. In this example, the NetFilters IPTables provide packets to custom analysis code that determines the suitability of the packets for DTN processing with reference to one or more bundling policies.

If the packet meets the criteria of one or more policies, the packet is copied out of the protocol stack, the IP and TCP headers are stripped and the addressing information is encoded as DTN addresses along with any additional addressing information defined in the policy. Next, the DTN BPA is automatically invoked by using the DTN BPA API to inject the bundled legacy application packet into the DTN delivery system. When the bundle nears or arrives at its intended destination, a BFA 514 (which may be located on an intermediate router as illustrated in FIG. 5 or on the destination client) intercepts and automatically repackages the bundle into the format expected by the destination application. Thus, because the BFA may operate between the application and the DTN BPA, DTN may be automatically used, where appropriate, without any change needing to be made to the applications.

Figure 6:
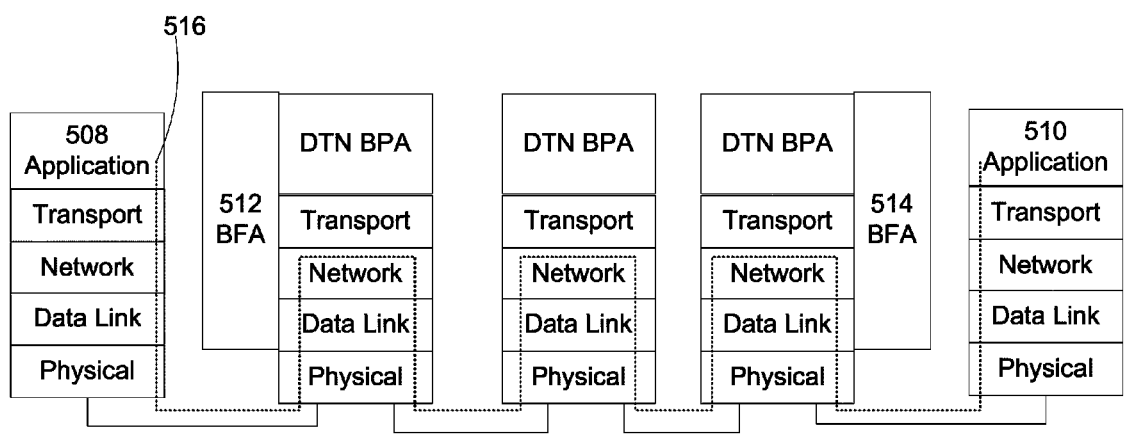
FIG. 6 is a block diagram illustrating the flow of information through an example distributed system in accord with aspects of the present invention.

According to one example, when the packet does not match any of the policies, the packet is allowed to proceed into the IP stack and continues to be routed to its final destination, as illustrated by a dotted line 516 in FIG. 6.

Figure 7:
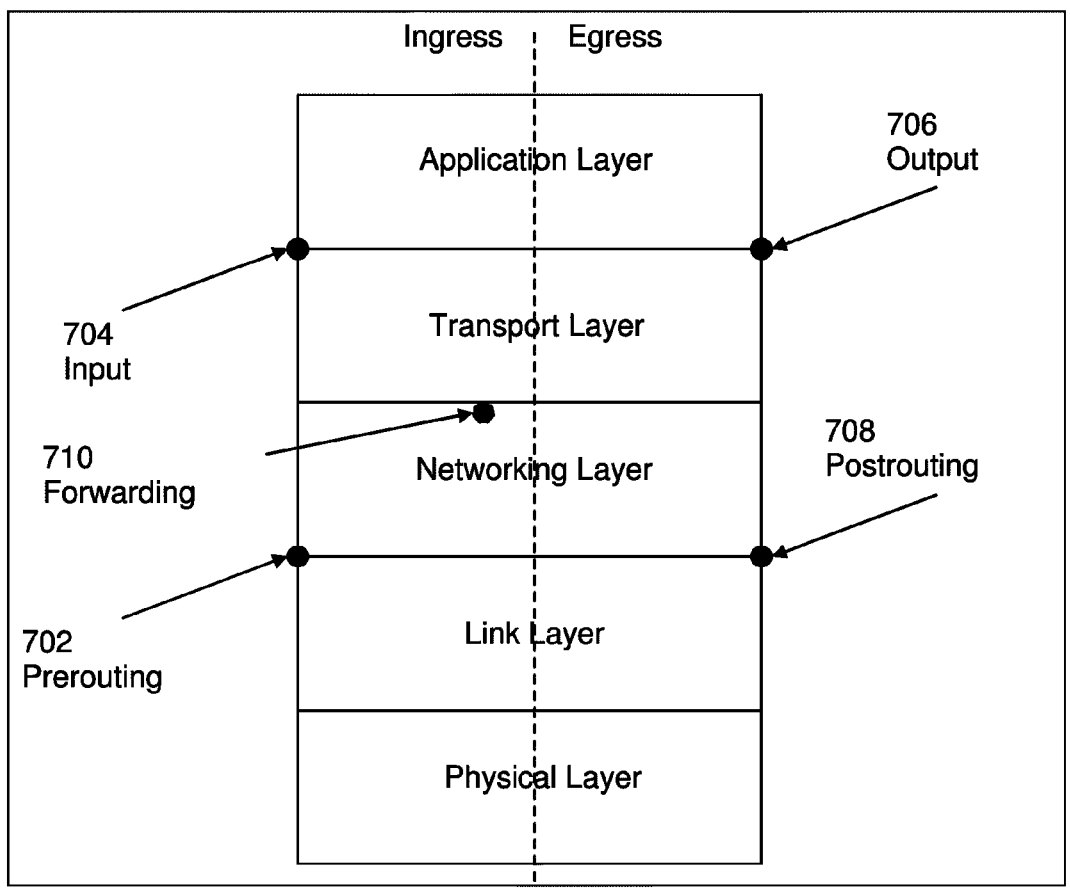
FIG. 7 is a block diagram illustrating an example of a packet handler as monitored by a packet monitor.

FIG. 7 illustrates various processing points at which a packet monitor, such as the packet monitors discussed with respect to FIGS. 4 and 5, may intercept packets within a packet handler. In the illustrated example, the packet handler includes a TCP/IP stack and the packet monitor is implemented using NetFilters IPTables. More particularly, as shown, NetFilters IPTables attaches a prerouting hook 702, an input hook 704, an output hook 706, a postrouting hook 708 and a forwarding hook 710 at various processing points within a TCP/IP stack. Packets encounter the prerouting hook 702 upon entry into the networking layer and prior to routing operations being performed on the packet. Packets encounter the input hook 704 before the packet is sent to the socket from the transport layer. Packets encounter the output hook 706 after exiting the socket and before being sent to the transport layer. Packets encounter the postrouting hook after routing decisions have been made. Packets encounter the forwarding hook if the packet is not destined for the computer system running the TCP/IP stack but must route through the computer system.

NetFilters IPTables supports four different table types: filter, nat, mangle and raw. At least one example uses the mangle table, which provides access to all five hooks discussed above. In another example, the raw table is used. The raw table provides access to the prerouting hook and the output hook.

Figure 8:
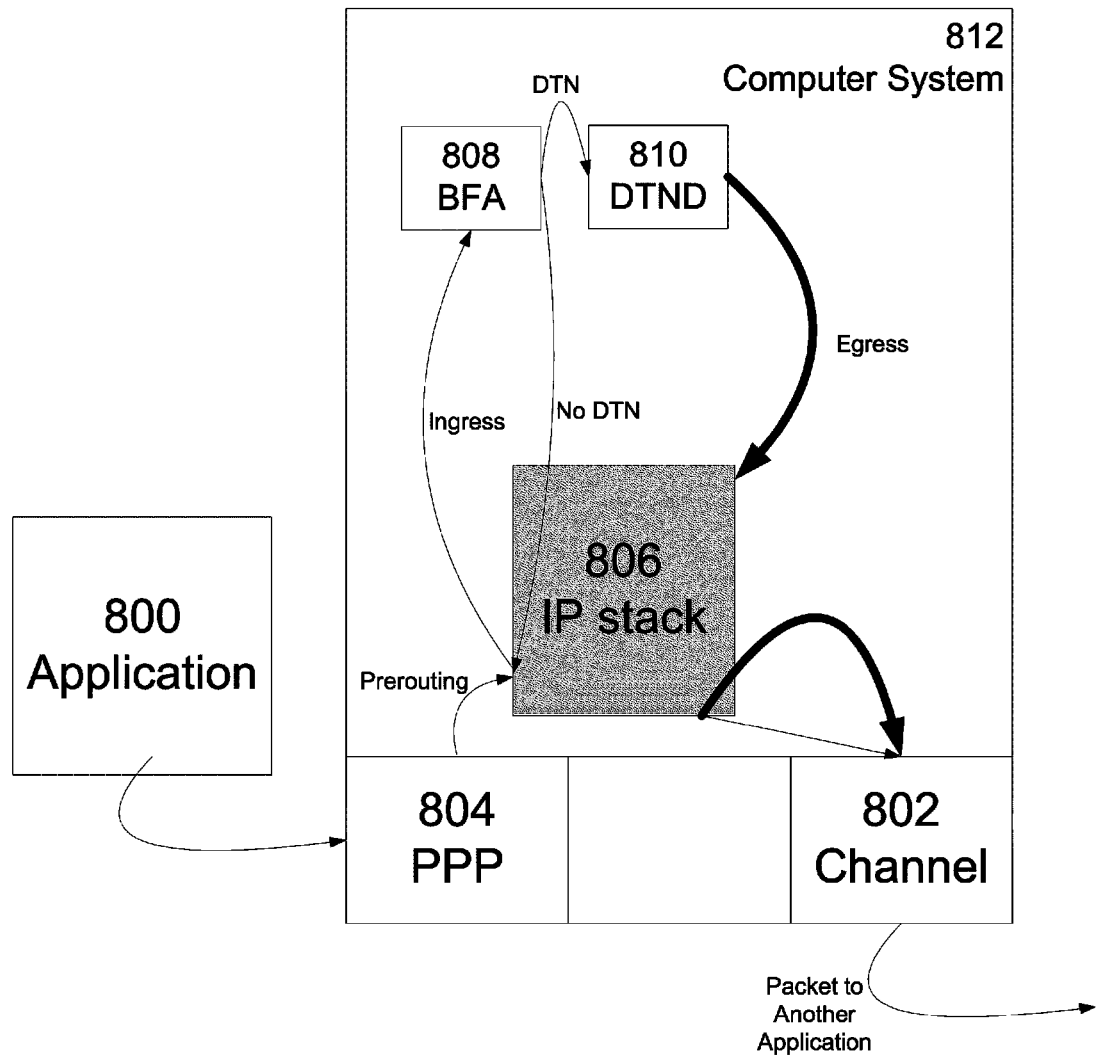
FIG. 8 is a block diagram illustrating an example of a packet handling process for sending bundles in accord with aspects of the present invention.

FIG. 8 illustrates a particular ingress packet handling process for sending a DTN packet, as discussed above with reference to FIGS. 4 and 5. According to this example, the actors executing the process include an application 800, and a computer system 812 that includes a point to point (PPP) link 804, an IP stack 806, a BFA 808 and a DTN daemon (DTND) 810. To begin, the application 800 sends a packet addressed to another application (not shown) via the PPP link 804. Next, the PPP link 804 provides the packet into the IP stack 806. When the packet encounters the prerouting hook, the computer system 812 forwards the packet to the BFA 808 which, according to one example, resides in the user space. Next, the BFA 808 analyzes the packet to determine if the packet is suitable for DTN processing.

In one example, the BFA 808 determines that the packet is suitable for DTN processing when the criteria of one or more bundling policies is met. If the packet is not suitable for DTN processing, the BFA 808 returns the packet to the IP stack, and the packet continues as if the BFA 808 had not intercepted it. If the BFA 808 determines that the packet is suitable for DTN processing, the packet is removed from the IP stack and is sent to the DTND 810. Upon receiving the packet, the DTND 810 bundles and addresses the packet to a corresponding destination DTND. In at least one example, the DTND 810 uses the following syntax to specify the destination address: dtn://<destination IP address>. Afterward, the DTND 810 injects the bundle into the application layer of the IP stack and the packet exits through the channel 802.

Figure 9:
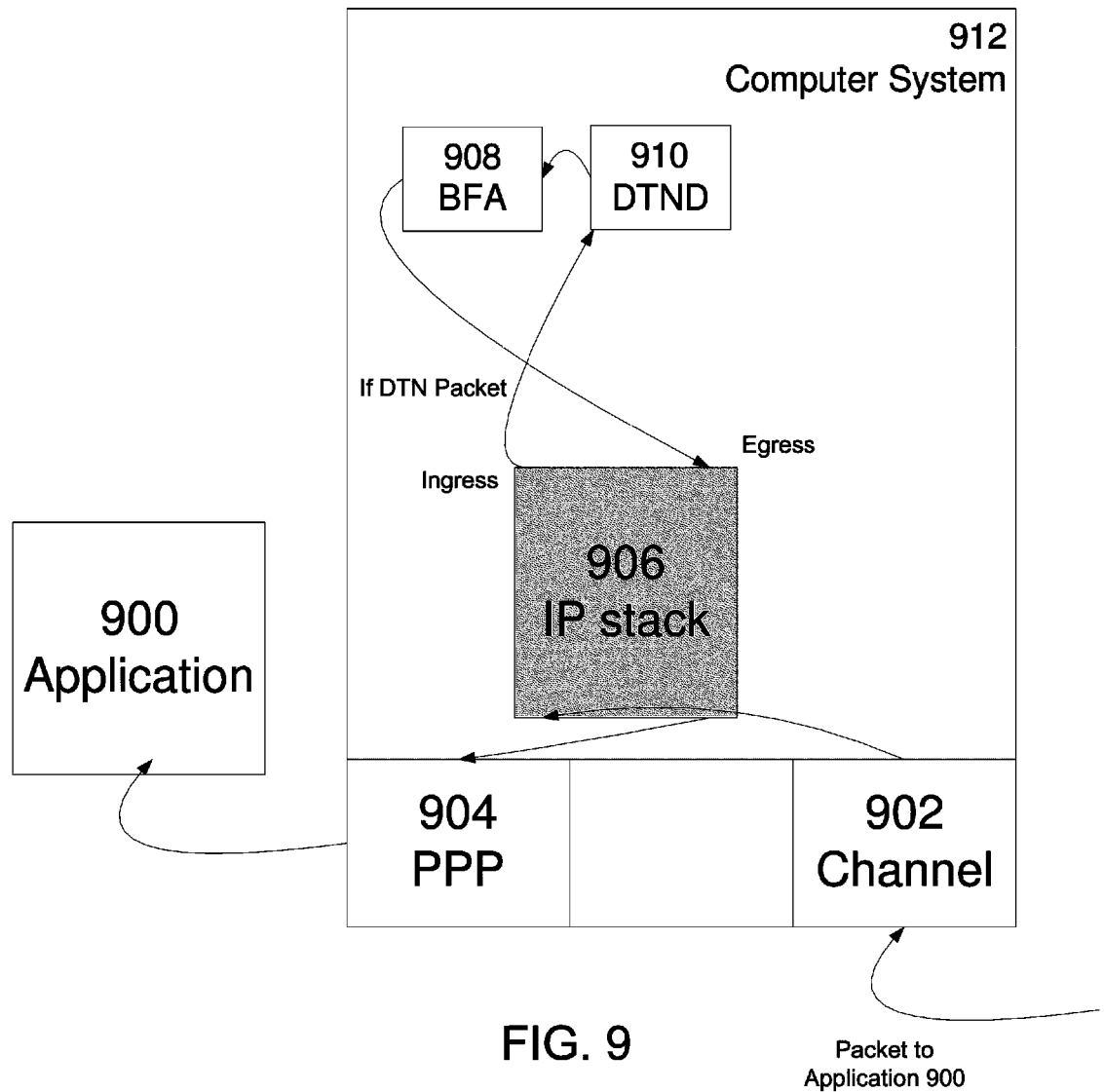
FIG. 9 is a block diagram illustrating an example of a packet handling process for receiving bundles in accord with aspects of the present invention.

FIG. 9 illustrates a particular ingress packet handling process for receiving a DTN bundle, as discussed above with reference to FIGS. 4 and 5. According to this example, the actors executing the process include an application 900, and a computer system 912 that includes a point to point (PPP) link 904, an IP stack 906, a BFA 908 and a DTN daemon (DTND) 910. To begin, the channel 902 receives a packet addressed to application 900. Next, the channel 902 provides the packet to the IP stack. If the packet is not a DTN bundle, the IP stack routes it normally and the packet is sent to the application 900 via the PPP link 904. If the packet is a DTN bundle, the bundle is sent to the DTND 910. Upon receipt of the bundle, the DTND 910 unbundles the packet and sends the packet to the BFA 908. Next, the BFA 908 receives the unbundled packet and performs any additional processing necessary to convert the packet back into a packet in the format expected by the destination. Subsequently, the BFA 908 provides the packet into the IP stack 906. Next, the IP stack 906 processes the packet and forwards the packet to the application 900 via the PPP link 904.

DTN Support Processes

Figure 10:
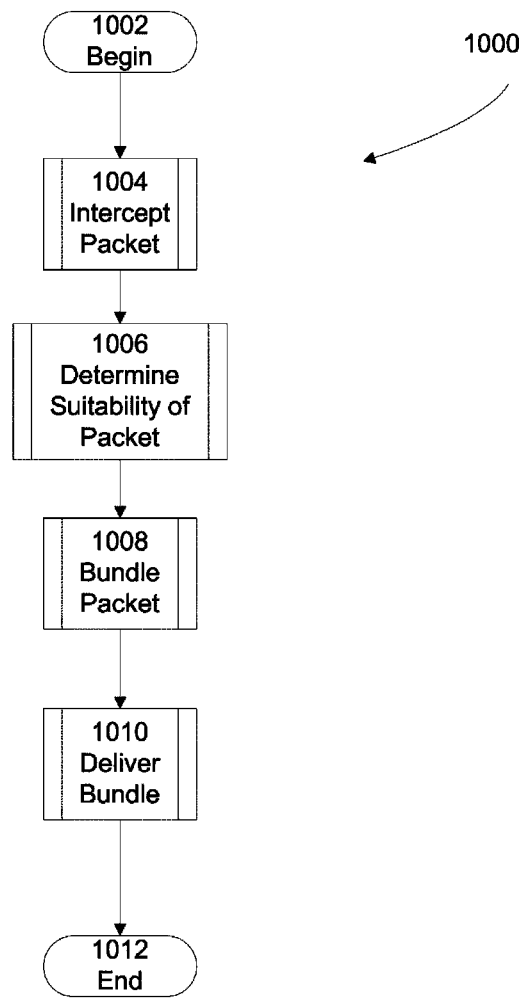
FIG. 10 is a flow chart of an example process for providing DTN processing to legacy applications in accord with aspects of the present invention.

Various examples provide processes for routing data using the DTN protocol over a network from a source application to a destination application. FIG. 10 illustrates one such process 1000 that includes acts of intercepting a packet, determining the suitability of the packet for DTN processing, bundling the payload of the packet into a DTN bundle and delivering the DTN bundle. Process 1000 begins at 1002.

In act 1004, packets are intercepted. According to various examples, a computer system intercepts these packets as the packets traverse a network. In these examples, the computer system may include a client, server, router or any other computer system capable of hosting aspects of a packet monitor. Acts in accord with these examples are discussed below with reference to FIG. 11.

In act 1006, the suitability of packets for DTN processing is determined. According to some examples, a computer system may determine the suitability of these packets for DTN processing with reference to one or more bundling policies. Acts in accord with these examples are discussed below with reference to FIG. 12.

In act 1008, packets are reformatted in compliance with the DTN protocol. According to several examples, a computer system bundles payloads into DTN bundles for further DTN processing. Acts in accord with these examples are discussed below with reference to FIG. 13.

In act 1010, packets are delivered via a DTN deliver system. According to a variety of examples, a network of computer systems delivers the packets to a destination application. Acts in accord with these examples are discussed below with reference to FIG. 14.

Process 1000 ends at 1012. DTN processing activities in accord with process 1000 provide legacy software with robust DTN handling of data transmissions without requiring modifications to the legacy software itself.

Figure 11:
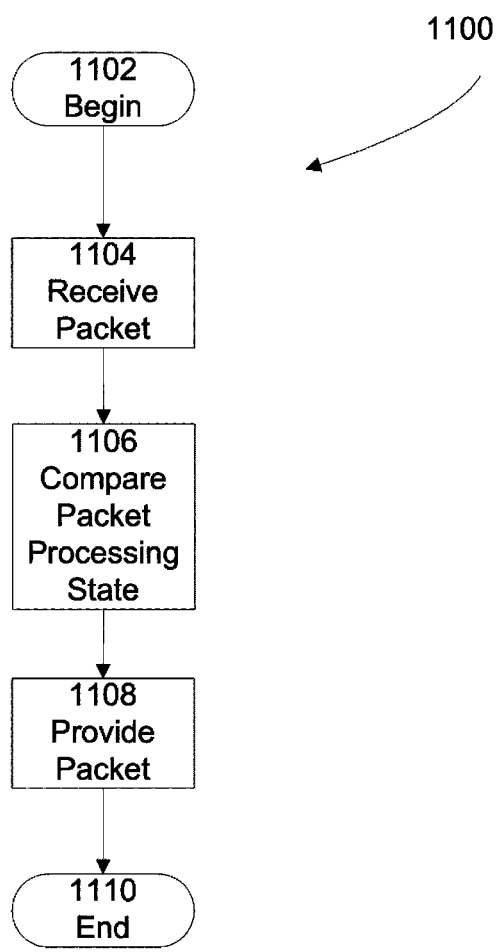
FIG. 11 is a flow chart of an example process for intercepting packets in accord with aspects of the present invention.

As discussed above with regard to act 1004 shown in FIG. 10, various examples provide processes for intercepting packets as the packets traverse a network. FIG. 11 illustrates one such process 1100 that includes acts of receiving a packet, comparing the processing state of the packet to a target processing state and providing the packet to another process. Process 1100 begins at 1102.

In act 1104, a computer system receives a packet addressed from a source application to a destination application. In one example, the computer system that receives the packet is arranged and configured to execute a packet handler as described above. In this example, the packet handler receives and processes the packet through a series of processing states. The packet handler may be able to process packets structured in accord with various protocols, such as TCP, UDP and IP, among others.

In act 1106, a computer system compares a current processing state of the packet to one or more specified processing states. In one example, the computer system that performs this comparison is arranged and configured to execute a packet handler and a packet monitor, both as described above. In this example, the packet monitor establishes processing states, e.g. hooks, within the packet handler, at which packets are provided to one or more other processes for handling, as discussed below.

In act 1108, a computer system provides the packet to another process for further processing. In one example, the computer system that provides the packet is arranged and configured to execute a packet handler, a packet monitor and a BFA. In this example, a packet that reaches a particular processing point within the packet handler is sent to the BFA for further processing.

Process 1100 ends at 1110. Various examples in accord with process 1100 may operate using a variety of protocols. For instance, in one example, the packet handler includes a TCP/IP stack and the packet monitor is implemented using NetFilters IPTables as discussed above. Thus examples using process 1100 may support legacy applications using a variety of protocols.

Figure 12:
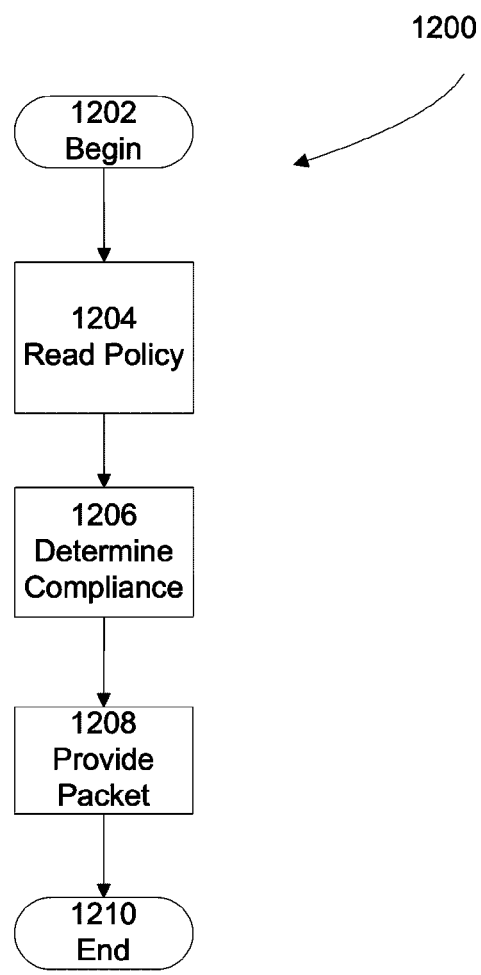
FIG. 12 is a flow chart of an example process for determining the suitability of packets for DTN processing in accord with aspects of the present invention.

As discussed above with regard to act 1006 shown in FIG. 10, various examples provide processes for determining the suitability of packets for DTN processing. FIG. 12 illustrates one such process 1200 that includes acts of reading a bundling policy, determining compliance of a packet with the policy and providing the packet for further processing. Process 1200 begins at 1202

In act 1204, a computer system reads one or more bundling policies. In one example, the computer system that reads the policies is arranged and configured to execute a BFA. In this example, the BFA reads the policies.

In act 1206, a computer system determines compliance of a packet with one or more policies. In one example, the computer system that makes this determination is arranged and configured to execute a BFA. In this example, the BFA analyzes policy statements, network environmental conditions and packet characteristics to determine whether a packet complies with one or more policies. According to this example, a packet is deemed compliant when the policy statements are met by the characteristics of the packet or the conditions of the network environment. In a particular example, the BFA analyzes content encoded according to TCP, UDP, IP or a particular application standard and determines compliance as a result of this analysis. In another particular example, the BFA analyzes at least one of a header and a payload to determine which, if any, options or parameters within DTN should be executed.

In act 1208, a computer system provides the packet to another process for further processing. In one example, the computer system that provides the packet is arranged and configured to execute a BFA. In this example, if the BFA finds a packet in compliance with one or more policies, the BFA copies the packet out of the packet handler and subjects the packet to additional DTN processing, as discussed further below.

Process 1200 ends at 1210.

Figure 13:
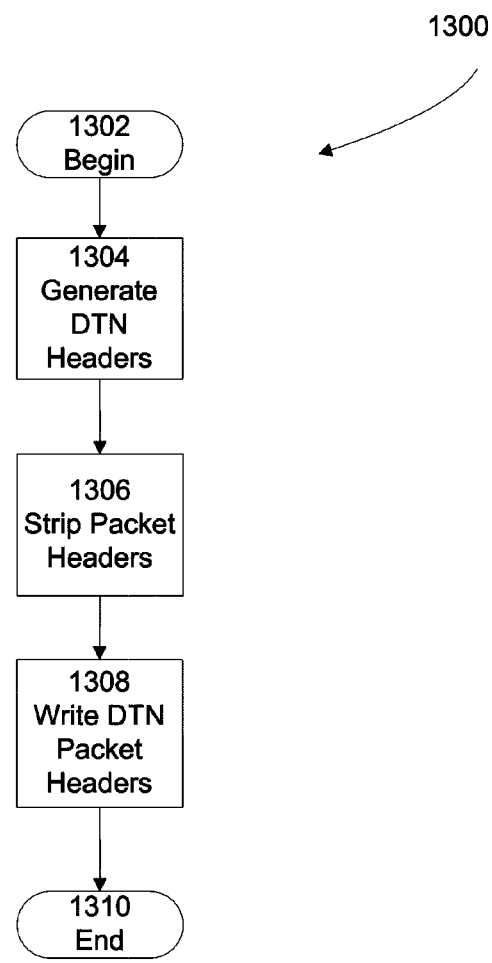
FIG. 13 is a flow chart of an example process for bundling packets in accord with aspects of the present invention.

As discussed above with regard to act 1008 shown in FIG. 10, various examples provide processes for reformatting a packet in compliance with the DTN protocol. FIG. 13 illustrates one such process 1300 that includes acts of generate DTN headers, stripping packet headers and writing DTN headers. Process 1300 begins at 1302

In act 1304, a computer system generates DTN headers. In one example, the computer system that generates the DTN headers is arranged and configured to execute a BFA. In this example, the BFA generates the headers in compliance with a bundling policy that specifies the DTN options to use for a particular packet. In another example, the BFA encodes addressing information as DTN addresses along with any additional addressing information defined in the policy. In act 1306, the computer system executing the BFA strips the packet headers. In act 1308, the computer system executing the BFA writes DTN headers into the packet.

Process 1300 ends at 1310. Upon completion of process 1300, the packet is arranged and configured for routing via a DTN server and may be injected into a DTN delivery system including one or more DTN servers via a DTN BPA. In one example, the packet is injected via the DTN BPA using a DTN BPA API.

Figure 14:
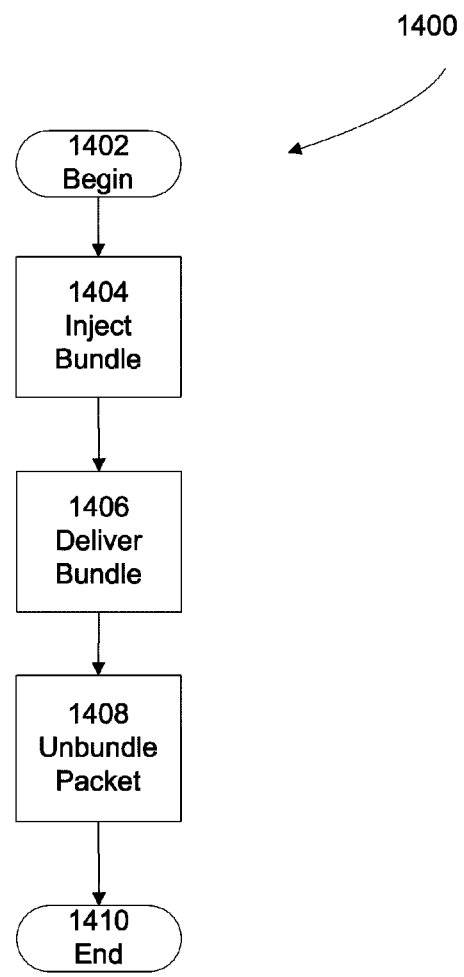
FIG. 14 is a flow chart of an example process for delivering bundles in accord with aspects of the present invention.

As discussed above with regard to act 1010 shown in FIG. 10, various examples provide processes for delivering a bundle using the DTN protocol. FIG. 14 illustrates one such process 1400 that includes acts of injecting the bundle, delivering the bundle and unbundling the packet. Process 1400 begins at 1402.

In act 1404, a computer system injects a bundle into a DTN delivery system. In one example, the computer system that injects the bundle is arranged and configured to execute a BFA. In this example, the BFA injects the bundle into the DTN delivery system, which includes one or more DTN servers, by utilizing a DTN BPA API to communicate with a DTN BPA.

In act 1406, a network of one or more computer systems delivers a bundle to a computer system configured to unbundle the packet. In one example, the computer system configured to unbundle the packet is located near the computer system hosting the destination application. In this example, the computer system configured to unbundle the packet may be a router. In another example, the computer system configured to unbundle the packet is the computer system hosting the destination application.

In act 1408, a computer system unbundles the packet prior to the packet arriving at the destination application. In one example, the computer system that unbundles the packet is arranged and configured to execute a BFA. In this example, the BFA unbundles and reformats the packet into a format expected by the destination application.

Process 1400 ends at 1410. Upon completion of process 1400, the packet is delivered to the destination application and has benefited from robust DTN handling without the destination application having been configured to process DTN bundles.

Each of processes 1000, 1100, 1200, 1300 and 1400 depicts one particular sequence of acts in a particular example. The acts included in each of these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. References to "or" may be construed as inclusive so that any terms described using "or" may indicate any of a single, more than one, and all of the described terms.

Having now described some illustrative aspects, it should be apparent to those skilled in the art that the foregoing is merely illustrative and not limiting, having been presented by way of example only. Similarly, aspects may be used to achieve other objectives. For example, while the bulk of the specification focuses on packet by packet processing, some examples may bundle a plurality of packets into a single DTN bundle. Numerous modifications and other illustrative examples are within the scope of one of ordinary skill in the art and are contemplated as falling within the scope of the systems and methods disclosed herein. In particular, although many of the examples presented herein involve specific combinations of method acts or system elements, it should be understood that those acts and those elements may be combined in other ways to accomplish the same objectives.

What is claimed is:

1. A computer-implemented method for providing delay tolerant networking (DTN) services to software applications, the method comprising:
   intercepting, by a first computer via an operating system hook, a packet addressed to a software application that does not support DTN protocol, the packet including a payload;
   determining suitability of the packet for DTN processing by, at least in part, reading an indication that packets having a specified characteristic are targeted for DTN servicing and determining whether or not the packet has the specified characteristic, wherein reading the indication includes reading the indication from a policy and determining whether or not the packet has the specified characteristic includes determining that the payload has a lifespan greater than a threshold value; and
   responsive to determining that the packet is suitable, encoding the payload into a DTN bundle according to the DTN protocol.

2. The method according to claim 1, wherein intercepting, by the first computer, a packet includes establishing the operating system hook from at least one of a prerouting hook, an input hook, an output hook, a postrouting hook, and a forwarding hook.

3. The method according to claim 1, wherein reading the indication includes reading an indication that packets generated by the software application are targeted for DTN servicing.

4. The method according to claim 1, wherein reading the indication includes reading an indication that packets having at least one of a specified protocol, a specified source address, a specified destination address, and a specified destination port are targeted for DTN servicing.

5. The method according to claim 1, wherein reading the indication includes reading an indication that packets generated by software applications in a specified processing state are targeted for DTN servicing, and determining whether or not the packet has the specified characteristic includes determining, from the packet, that the software application is in the processing state.

6. The method according to claim 1, wherein reading the indication includes reading an indication that packets generated by software applications performing a specified function are targeted for DTN servicing and determining whether or not the packet has the specified characteristic includes determining, from the packet, that the software application is performing the specified function.

7. The method according to claim 1, wherein reading the indication includes reading an indication that packets including payloads having a specified characteristic are targeted for DTN servicing and determining whether or not the packet has the specified characteristic includes determining that the payload has the specified characteristic.

8. The method according to claim 7, wherein reading the indication that packets including payloads having the specified characteristic are targeted for DTN servicing includes reading an indication that packets including payloads having at least one of a specified data type, and an acceptable latency for delivery to the software application are targeted for DTN servicing.

9. The method according to claim 1, wherein encoding the payload includes at least one of stripping at least one protocol header from the packet, and encoding the payload in response to a determination that a value in the packet is greater than a threshold.

10. The method according to claim 1, wherein the software application is resident on a second computer and the method further comprises transmitting the DTN bundle to the second computer.

11. The method according to claim 1, further comprising:
    determining a route for the packet; and
    wherein determining the suitability of the packet includes determining whether the route has failed.

12. The method according to claim 1, further comprising encoding another payload from a different packet into the DTN bundle.

13. The method according to claim 10, further comprising:
    decoding, by the second computer, the payload from the DTN bundle; and
    providing, by the second computer, the payload to the software application.

14. The method according to claim 1, further comprising, responsive to determining that the packet is not suitable, returning the packet to a stack of origin for the packet and forwarding the packet toward a destination using an initial protocol associated with the packet.

15. A computer system for providing delay tolerant networking (DTN) services to software applications, the system comprising:
    a network interface;
    a memory; and
    a controller coupled to the network interface and the memory and configured to:
      automatically intercept, via an operating system hook, a packet addressed to a software application that does not support DTN, the packet including a payload;
      determine suitability of the packet for DTN processing by, at least in part, reading an indication that packets having a specified characteristic are targeted for DTN servicing and determining whether or not the packet has the specified characteristic, wherein reading the indication includes reading the indication from a policy and determining whether or not the packet has the specified characteristic includes determining that the payload has a lifespan greater than a threshold value; and
      responsive to a determination that the packet is suitable for DTN processing, encode the payload into a DTN bundle according to the DTN protocol.

16. The system according to claim 15, wherein the specified characteristic is at least one of a specified protocol, a specified source address, a specified destination address and a specified destination port.

17. The system according to claim 15, wherein the controller coupled to the network interface and the memory is further configured to, responsive to a determination that the packet is not suitable for DTN processing, return the packet to a stack of origin for the packet and forward the packet toward a destination using an initial protocol associated with the packet.

18. The system according to claim 15, wherein the operating system hook includes at least one of a prerouting hook, an input hook, an output hook, a postrouting hook, and a forwarding hook.

19. The system according to claim 15, wherein the indication indicates that packets generated by the software application are targeted for DTN servicing.

20. The system according to claim 15, wherein the indication indicates that packets generated by software applications in a specified processing state are targeted for DTN servicing, and determining whether or not the packet has the specified characteristic includes determining, from the packet, that the software application is in the processing state.

21. The system according to claim 15, wherein the indication indicates that packets generated by software applications performing a specified function are targeted for DTN servicing and determining whether or not the packet has the specified characteristic includes determining, from the packet, that the software application is performing the specified function.

22. The system according to claim 15, wherein the indication indicates that packets including payloads having a specified characteristic are targeted for DTN servicing and determining whether or not the packet has the specified characteristic includes determining that the payload has the specified characteristic.

23. The system according to claim 15, wherein the software application is resident on a second computer and the controller coupled to the network interface and the memory is further configured transmit the DTN bundle to the second computer via the network interface.

24. A system for providing delay tolerant networking (DTN) services to software applications, the system comprising a first computer and a second computer, the first computer including:
    a first network interface;
    a first memory; and
    a first controller coupled to the first network interface and the first memory and configured to:
        automatically intercept, via an operating system hook, a packet addressed to a software application that does not support DTN protocol, the packet including a payload;
        determine suitability of the packet for DTN processing by, at least in part, reading an indication that packets having a specified characteristic are targeted for DTN servicing and determining whether or not the packet has the specified characteristic, wherein reading the indication includes reading the indication from a policy and determining whether or not the packet has the specified characteristic includes determining that the payload has a lifespan greater than a threshold value; and
        responsive to a determination that the packet is suitable for DTN processing, encode the payload into a DTN bundle according to the DTN protocol.

25. The system according to claim 24, wherein the second computer comprises:
    a second network interface;
    a second memory; and
    a second controller coupled to the second network interface and the second memory and configured to:
        receive the DTN bundle via the second network interface; and
        decode the packet addressed to the software application from the DTN bundle.

* * * * *